US009386239B2

(12) United States Patent
Gustafson et al.

(10) Patent No.: US 9,386,239 B2
(45) Date of Patent: Jul. 5, 2016

(54) THERMAL ISOLATION DEVICE FOR INFRARED SURVEILLANCE CAMERA

(71) Applicant: DRS RSTA, INC., Dallas, TX (US)

(72) Inventors: Eric J. Gustafson, Celeste, TX (US); Glen Francisco, Fairview, TX (US); Adam J. Ward, Dallas, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 590 days.

(21) Appl. No.: 13/622,304

(22) Filed: Sep. 18, 2012

(65) Prior Publication Data

US 2013/0070102 A1    Mar. 21, 2013

Related U.S. Application Data

(60) Provisional application No. 61/536,945, filed on Sep. 20, 2011.

(51) Int. Cl.
*H04N 5/33* (2006.01)
*G01J 5/04* (2006.01)
*H04N 5/225* (2006.01)
*G01J 5/06* (2006.01)

(52) U.S. Cl.
CPC . *H04N 5/33* (2013.01); *G01J 5/043* (2013.01); *H04N 5/2251* (2013.01); *G01J 2005/063* (2013.01)

(58) Field of Classification Search
CPC .......... G01J 2005/062–2005/068; G01J 5/061; H04N 5/33; H04N 5/2251
USPC ........................................................ 250/330
See application file for complete search history.

(56) References Cited

U.S. PATENT DOCUMENTS

| 3,815,736 A * | 6/1974 | Sedlak ........................ 206/501 |
| 3,939,346 A * | 2/1976 | Tutihashi .................... 250/330 |
| 5,839,284 A * | 11/1998 | Wyatt ....................... G01J 5/02 348/E5.09 |
| 6,023,061 A | 2/2000 | Bodkin |
| 6,297,504 B1 * | 10/2001 | Andreou .................... 250/330 |

(Continued)

FOREIGN PATENT DOCUMENTS

WO    WO 2013/043611 A1    3/2013

OTHER PUBLICATIONS

Notification of Transmittal of the International Search Report and the Written Opinion of the International Searching Authority, or the Declaration; International Search Report and Written Opinion of the International Searching Authority for corresponding International application No. PCT/US2012/055935 mailed on Nov. 30, 2012, 8 pages.
Swedish Office Action mailed Oct. 8, 2015 in SE Patent Application No. 1450472-4, 16 pages.

*Primary Examiner* — David Porta
*Assistant Examiner* — Jeremy S Valentiner
(74) *Attorney, Agent, or Firm* — Kilpatrick Townsend & Stockton LLP (57) ABSTRACT

A thermal imaging system includes a mounting structure characterized by a first thermal conductivity and a focal plane array mounted to the mounting structure. The thermal imaging system also includes an optical system coupled to the mounting structure and a heating element coupled to the mounting structure. The thermal imaging system further includes a thermal isolator coupled to the mounting structure and characterized by a second thermal conductivity lower than the first thermal conductivity.

20 Claims, 6 Drawing Sheets

(56) References Cited

U.S. PATENT DOCUMENTS

| | | |
|---|---|---|
| 6,507,024 B2 | 1/2003 | Stewart |
| 6,626,835 B1 * | 9/2003 | Kraus .................. G01J 5/0003 374/E13.003 |
| 7,402,802 B1 * | 7/2008 | Terre et al. .................... 250/330 |
| 2004/0114920 A1 * | 6/2004 | Rife .............................. 396/535 |
| 2007/0023661 A1 | 2/2007 | Wagner et al. |
| 2007/0103543 A1 * | 5/2007 | Anderson et al. ............... 348/36 |
| 2009/0078870 A1 * | 3/2009 | Haruna ......................... 250/330 |
| 2009/0140149 A1 * | 6/2009 | Tinnes ...................... G01J 5/04 250/352 |
| 2010/0100275 A1 * | 4/2010 | Mian et al. ...................... 701/29 |
| 2010/0315252 A1 * | 12/2010 | Desphande et al. .......... 340/670 |
| 2012/0089208 A1 * | 4/2012 | York ................... A61N 5/0625 607/100 |

* cited by examiner

THERMAL ISOLATION DEVICE FOR INFRARED SURVEILLANCE CAMERA

CROSS-REFERENCES TO RELATED APPLICATIONS

This application claims priority to U.S. Provisional Patent Application No. 61/536,945, filed on Sep. 20, 2011, entitled "Thermal Isolation Device for Infrared Surveillance Camera," the disclosure of which is hereby incorporated by reference in its entirety for all purposes.

BACKGROUND OF THE INVENTION

Thermal imaging systems detect radiation in the infrared range of the electromagnetic spectrum (~9-15 μm) in order to provide images of objects producing the radiation. Since objects at any non-zero temperatures emit infrared radiation (i.e., they are black body radiation sources), thermal imaging makes it possible to see objects and the environment in the absence of visible illumination. Because the amount of radiation emitted by an object increases with temperature, thermal imaging is useful in observing temperature variations. When viewed using a thermal imaging system, warm objects are distinguishable against cooler backgrounds, making people, animals, and the like, visible, even at night time. Thermal imaging has found widespread application in military systems as well as surveillance cameras.

Despite the progress made in the field of thermal imaging, there is a need in the art for improved methods and systems related to thermal imaging.

SUMMARY OF THE INVENTION

The present invention relates generally to thermal imaging systems. More particularly, embodiments of the present invention provide methods and systems for achieving thermal isolation for infrared surveillance cameras. The present invention has applicability to a wider set of applications including other infrared imaging systems.

According to an embodiment of the present invention, a thermal imaging system is provided. The thermal imaging system includes a mounting structure characterized by a first thermal conductivity and a focal plane array mounted to the mounting structure. The thermal imaging system also includes an optical system coupled to the mounting structure and a heating element coupled to the mounting structure. The thermal imaging system further includes a thermal isolator coupled to the mounting structure and characterized by a second thermal conductivity lower than the first thermal conductivity.

According to another embodiment of the present invention, a thermal camera is provided. The thermal camera includes a housing and a multi-element front cover including a thermal dam joined to the housing and having a first thermal conductivity and a mounting structure joined to the thermal dam, spatially separated from the housing, and characterized by a second thermal conductivity greater than the first thermal conductivity. The thermal camera also includes a heating element thermally coupled to the mounting structure and an infrared imager mounted to the mounting structure. The thermal camera further includes a front window mounted to the mounting structure.

According to a specific embodiment of the present invention, a method of operating a thermal imaging system is provided. The method includes providing a thermal camera disposed in a housing. The thermal camera includes a mounting structure and a thermal isolator spatially separating the mounting structure from the housing. The thermal camera also includes a heating element bonded to the mounting structure and a front window coupled to the mounting structure. The method also includes providing power to the thermal imaging system in compliance with the 802.3af standard and determining that an ambient temperature is less than or equal to a threshold temperature. The method further includes heating the heating element and conducting heat from the heating element to the front window.

According to an embodiment of the present invention, a thermal isolation system includes a heater and a first material coupled to the heater. The first material is characterized by a first thermal conductivity. The thermal isolation system also includes a second material coupled to the first material. The second material is characterized by a second thermal conductivity lower than the first thermal conductivity.

Numerous benefits are achieved by way of the present invention over conventional techniques. For example, embodiments of the present invention maximize power available to the heater, optimize power input, and reduce or minimize parasitic heat loss to the surrounding environment from the heater during operation in the heating mode. In contrast to conventional systems, in which the part at which the heater is attached is made of a single high thermal conductivity material, embodiments of the present invention create a thermal dam between the heater and the outer housing. Thus, embodiments utilize a multi-element part with partial high thermal conductivity and partial low thermal conductivity, with the high conduction side adjacent the camera and providing thermal conductivity between the front window, the camera, and the heater and the low conduction side adjacent to and providing a thermal barrier to the external housing. The low conduction side or element provides an environmental seal while also being structurally viable to support the weight of the heater and the camera during vibration and shock loading, which are to be expected. These and other embodiments of the invention along with many of its advantages and features are described in more detail in conjunction with the text below and attached figures.

DETAILED DESCRIPTION OF THE INVENTION

The present invention relates generally to thermal imaging systems. More particularly, embodiments of the present invention provide methods and systems for achieving thermal isolation for infrared surveillance cameras. The present invention has applicability to a wider set of applications including other infrared imaging systems.

Figure 1:
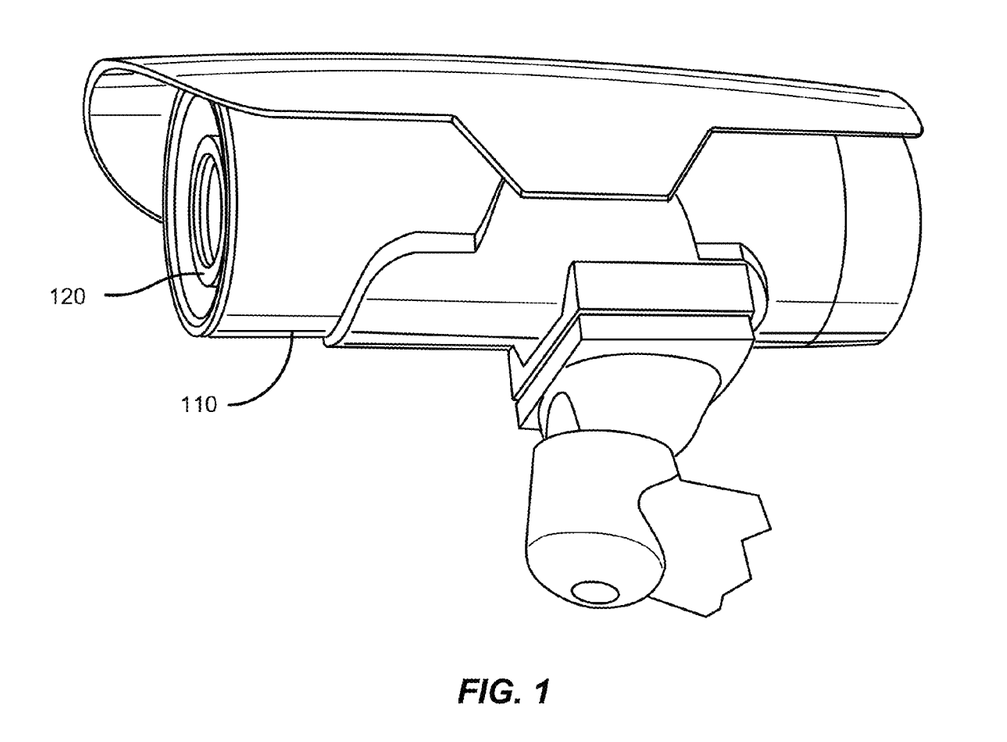
FIG. 1 is a simplified perspective diagram illustrating a thermal camera system according to an embodiment of the present invention.

FIG. 1 is a simplified perspective diagram illustrating a thermal camera system according to an embodiment of the present invention. As illustrated in FIG. 1, the thermal camera system includes a housing 110 that is exposed to the surrounding environment. According to an embodiment, the housing 110 is an IP66 rated housing fabricated from aluminum or other suitable material including metallic materials, providing an enclosure suitable for operation over a range of temperatures, for example, from −40° C. to +65° C. The thermal camera system also includes a front window 120, which can include one or more optical elements including one or more lenses, optical filters, and the like. The front window 120, which includes one or more optical elements) is exposed to the ambient environment and liquids such as water or water vapor present on the front window could freeze into ice during operation at the lower end of the temperature range. Accordingly, embodiments of the present invention provide thermal control systems to enable operation over a predetermined temperature range without formation of ice on the front window. Thus, embodiments of the present invention provide methods and systems that are anti-icing systems. The anti-icing system will prevent ice formation on the front window 120 during operation as long as power is supplied to the thermal camera system as described more fully herein.

Figure 2:
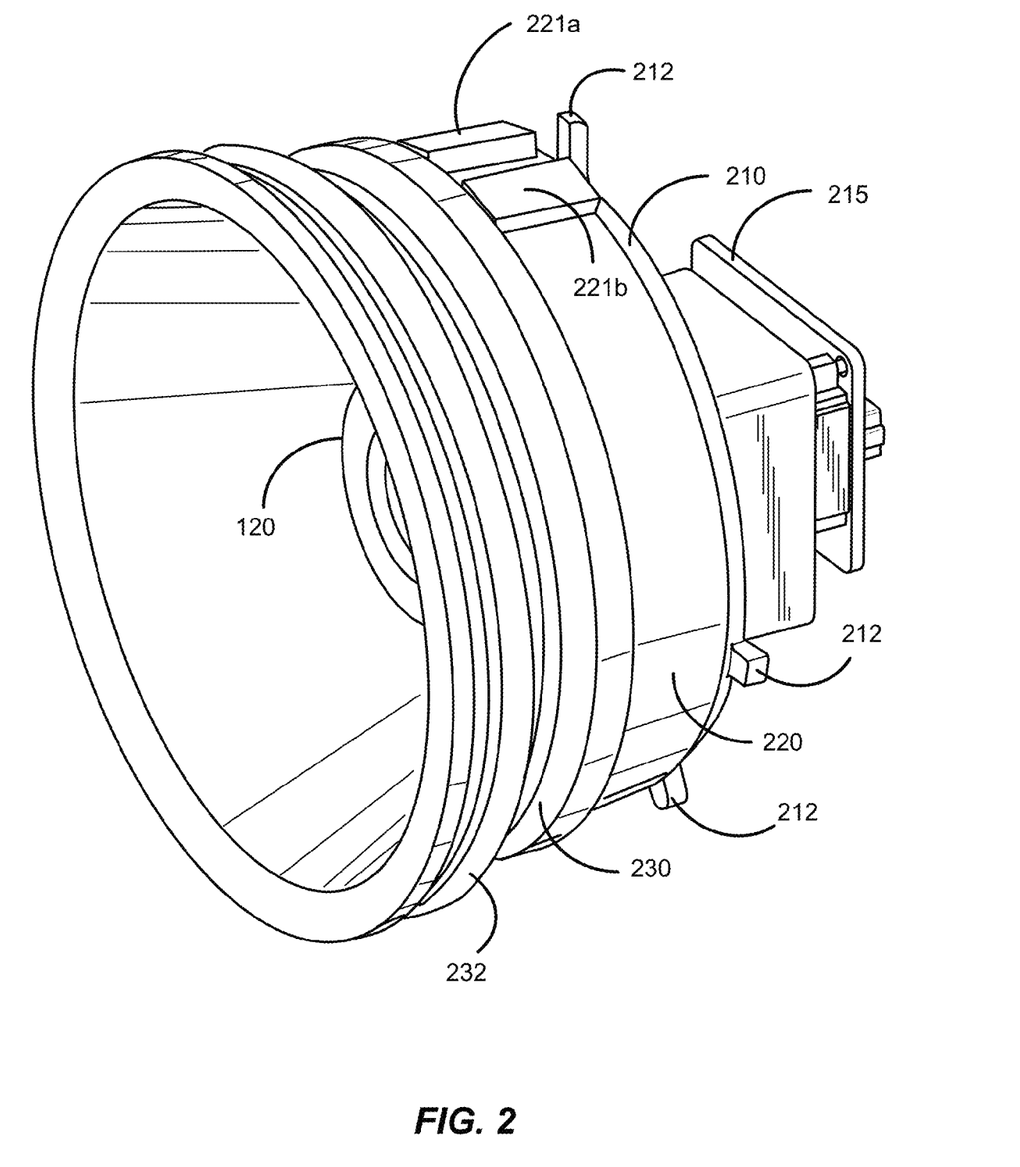
FIG. 2 is a simplified perspective diagram illustrating a multi-element front cover according to an embodiment of the present invention.

FIG. 2 is a simplified perspective diagram illustrating a multi-element front cover according to an embodiment of the present invention. Referring to FIG. 1, the multi-element front cover is located at the front portion of the housing, with the front window 120 illustrated in both FIG. 1 and FIG. 2. Referring to FIG. 2, a mounting structure 210 is provided that provides mechanical support and a thermally conductive path to a focal plane array 215 and the front window 120. Although not illustrated in the figure, the front window is coupled to optical elements as described more fully herein.

In an embodiment, the focal plane array is an uncooled vanadium oxide (VOx) microbolometer with a predetermined resolution, for example, 320×240, 640×480 or other suitable resolution. The focal plane array provides a spectral response across a predetermined spectral band, for example, the long wave infrared (LWIR) band from 8-14 µm, although other spectral bands may be associated with the focal plane array.

Also illustrated in FIG. 2 is front window 120, which is optically coupled to an optical system that collects and images light onto the focal plane array 215. In some embodiments, a lens is integrated with the front window, with an annular structure disposed around the lens. In different embodiments, the optical system can provide differing fields of view, for example, a horizontal field of view of 40°, a field of view of 16°, a field of view of 9°, or the like and an f/# of 1.2. In a particular embodiment, the optical system includes a germanium lens that is integrated with the front window of the camera system to provide a first optical surface and focusing power for imaging operation. Although germanium optics are utilized in some embodiments, this particular material system is not required by the present invention and other optical elements suitable for transmitting infrared radiation, specifically LWIR radiation, are included within the scope of the present invention.

The mounting structure 210 is fabricated from a material with high thermal conductivity, including metallic materials, that provide mechanical support for the focal plane array and the front window. In some embodiments, the mounting structure 210 is fabricated from aluminum, other suitable metals, metallized plastics, Xyloy™ injection molded zinc/aluminum alloy, other metallic alloys, and the like. Examples of other suitable materials for the mounting structure include alloys of magnesium, copper, zinc, brass, other materials with high thermal conductivity and moderate ultimate strength. Preferably, the mounting structure is characterized by a thermal conductivity ranging from about 100 W/m-K to about 1,000 W/m-K, for example, between about 100 W/m-K and 400 W/m-K. Magnesium resides at the low end of this range and copper resides at the high end of this range with aluminum alloys generally close to the center of this range.

FIG. 2 illustrates a plurality of tabs 212 extending from the peripheral edges of the mounting structure 210. The plurality of tabs are useful in positioning the multi-element front cover in the housing illustrated in FIG. 1. A heating element 220 is coupled to the peripheral portion of the mounting structure 210 and is operable to provide thermal energy to heat the mounting structure during operation. The heating element illustrated in FIG. 2 is a flexible heater that is wrapped around the mounting structure, with electrical contact pads 221a and 221b adjacent each other, providing electrical inputs to operate the heater. In an embodiment, the heating element is a flexible silicone etched foil heater available from NorthEast Flex Heaters Inc. of Warwick, R.I. that is bonded to the peripheral surface of the mounting structure. Other suitable heating elements that can be joined to the mounting structure are included within the scope of the present invention.

The multi-element front cover also includes a thermal isolator 230 coupled to the front surface of the mounting structure. The thermal isolator 230 has an outside diameter that is greater than the outside diameter of the mounting structure. Thus, when mounted in the housing, the thermal isolator is in contact with the housing, but the mounting structure is spatially separated from the housing. The thermal isolator and the mounting structure can have a diameter that varies as a function of longitudinal dimension. In some embodiments, the largest diameter of the mounting structure will be less than or equal to the largest diameter of the thermal isolator. Thus, once joined, the thermal isolator will extend to a larger radial extent than the mounting structure, providing a spatial separation (e.g., an air gap or a gap filled by a thermally insulating material) between the mounting structure and the housing. As described more fully below in relation to FIG. 4, the spatial separation of the mounting structure from the housing and the larger diameter of the thermal isolator enables the thermal isolator, which has a lower thermal conductivity than the mounting structure to serve as a thermal dam, blocking thermal transport from the heating element 220 to the housing. The thermal isolator is fabricated from suitable low thermal conductivity materials, including a plastic material such as polycarbonate resin thermoplastic. The present invention is not limited to the use of this material and other materials, including nylons, acetal, ultem, polyetherimide and a variety of other engineering materials including engineered plastics with sufficient strength and low thermal conductivity can be used. Any material with high strength and thermal conductivity on the order of 1 W/m-K, can be utilized to fabricate the thermal isolator. The thermal isolator 230 is characterized by a thermal conductivity ranging from about 0.018 W/m-K to about 0.6 W/m-K, for example, between 0.1 W/m-K and 0.4 W/m-K. NASA Aerogel has a thermal conductivity of 0.018 W/m-K and polycarbonate has a typical thermal conductivity of about 0.3 W/m-K. It should be noted that Aerogel is relatively fragile, which is addressed by structures that will be adapted for the low strength of the material.

An o-ring 232 is illustrated in FIG. 2 and is provided to form a seal with the housing, enabling compliance with IP66 or other suitable housing ratings. As illustrated in FIG. 2, the front end of the camera includes the multi-element front cover that utilizes a low thermal conductivity material such as plastic. The design not only creates a seal with the housing but also creates a high thermal resistance between the location of the heater and the housing. This design prevents heat flow to the housing that would otherwise radiate and convect a good deal of heat to the ambient environment.

Figure 3:
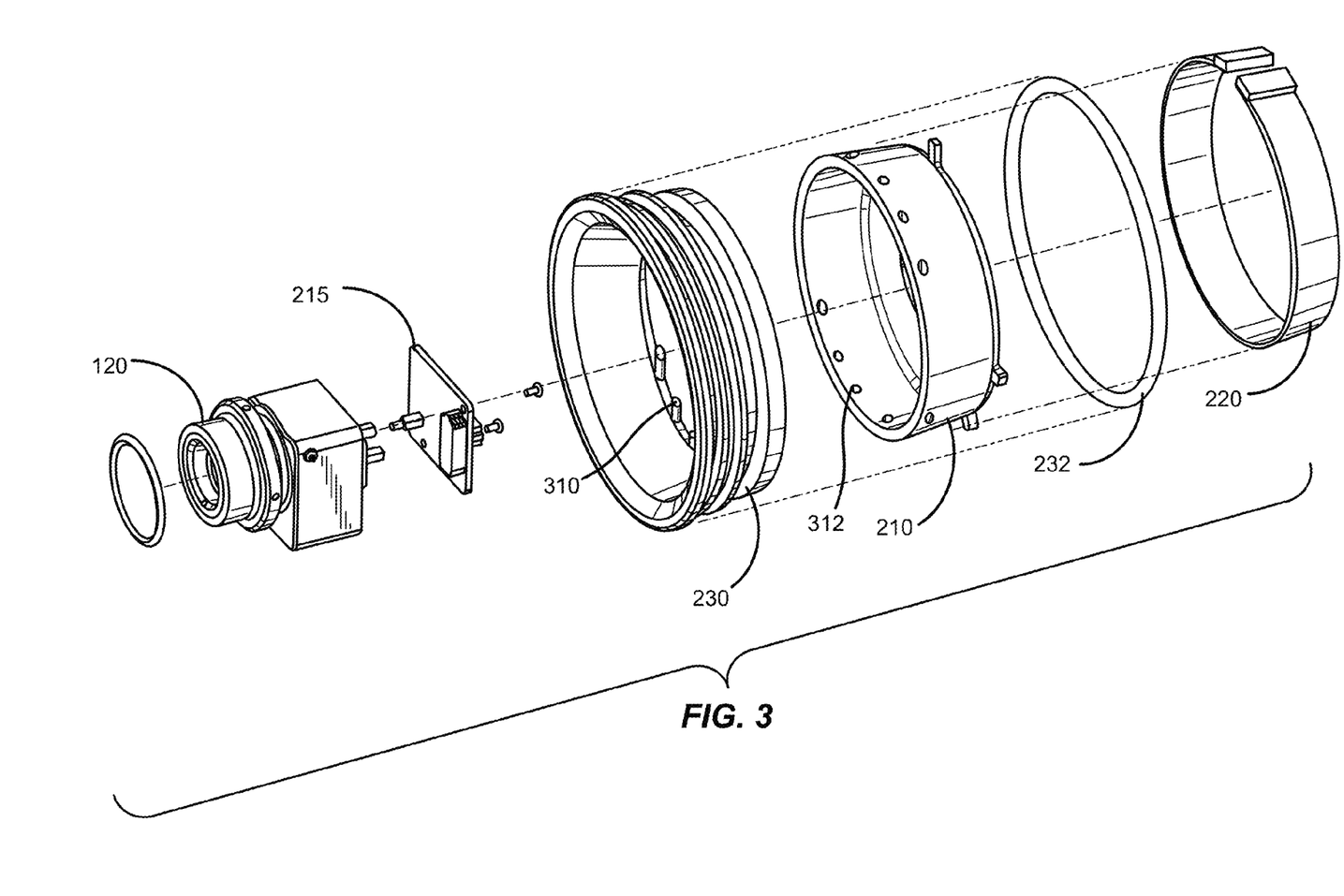
FIG. 3 is an exploded perspective diagram illustrating the multi-element front cover shown in FIG. 2.

FIG. 3 is an exploded perspective diagram illustrating the multi-element front cover illustrated in FIG. 2. Reference numbers utilized in relation to the description provided for FIG. 2 are utilized in FIG. 3 for ease of understanding. The mounting structure 210 is illustrated and includes a plurality of openings 312 that mate with tabs 310 extending from the inner periphery of thermal isolator 230. As illustrated, the outer surface of the mounting structure 210 is joined to the inner surface of thermal isolator 230. The heating element 220 is wrapped around a portion of the mounting structure, which then conducts the heat from the heating element into the front window 120 as well as the focal plane array 215.

According to an embodiment of the present invention, the combination of materials described herein is used to efficiently apply heat from the heating element to the front window, lens, or mirror that is desired to be free of ice or fog across a wide range of ambient temperatures. The multi-element front cover includes a material with low thermal conductivity in relation to how it attaches to its surrounding structure to reduce the thermal conduction of heat to the surrounding environment, thereby preventing some heat from escaping. The multi-element front cover also uses a material with high thermal conductivity attached to the item to be heated in order to transfer heat directly and efficiently to that item. Furthermore, the device is efficient in doing this, such that it allows 802.3af compliant "Power over Ethernet" (also referred to as power over IP, PoE, or PoI) to be sufficient to heat the device.

Embodiments of the present invention utilize a "thermal dam" or thermal isolation system to increase the efficiency of anti-icing (which can also include deice/defog in some embodiments) for cameras, lenses, windows or other electronic devices in order to meet extremely low power conditions & limitations (such as, without limitation, with the 802.3af PoE standard). The methods of heat isolation provided by embodiments of the present invention allow an instrument to efficiently use available power to defog, anti-ice, or de-ice a camera, window, mirror or electronic device, all under extremely low power 802.3af PoE conditions. This allows devices to perform over a larger temperature range more efficiently without being impacted (or reducing the impact) by fogging or ice formation on the optical elements, or even on sensitive electronics or other components that are desired to be free of condensation, fogging or ice, and for systems that must integrate into an existing low power 802.3af PoE constrained system (with which most low power visible IP cameras comply). It should be noted that compliance with 802.3af PoE enables the thermal camera system described herein to be integrated into existing infrastructure, including existing Ethernet cabling, which is suitable for carrying the 15.4 W maximum power associated with 802.3af PoE.

Embodiments of the present invention provide systems suitable for operating using a low level power input while properly providing anti-icing for the camera lens. As described herein, embodiments utilize a thermal dam (also referred to as a thermal isolator) to use an amount of power available under predetermined standards and still meet requirements to properly anti-ice the camera lens. These systems contrast with conventional techniques of placing a heating element adjacent the front window, which consumes too much power to operate effectively in compliance with the 802.3af PoE standard.

Embodiments of the present invention prevent ice from accumulating on the front window over a predetermined temperature range. Some embodiments prevent icing, whereas other embodiments can perform a de-icing function in which ice already accumulated on the front window can be melted, although de-icing functionality is not required by embodiments of the present invention. As described herein, thermal energy provided to the unit by the heating element is sufficient to prevent ice accumulation over the predetermined temperature range, for example, −40° C. to +65° C.

Embodiments of the present invention utilize POE compliant with 802.3af for the operation of the camera, including the heating element. Accordingly, operating at a power of <15.4 W, the use of the thermal dam enables the heating of the front window (also referred to as an optical system or a front lens assembly) with reduced loss of thermal energy to the surrounding environment, enabling prevention of icing while using less than 15 W of power.

Figure 4:
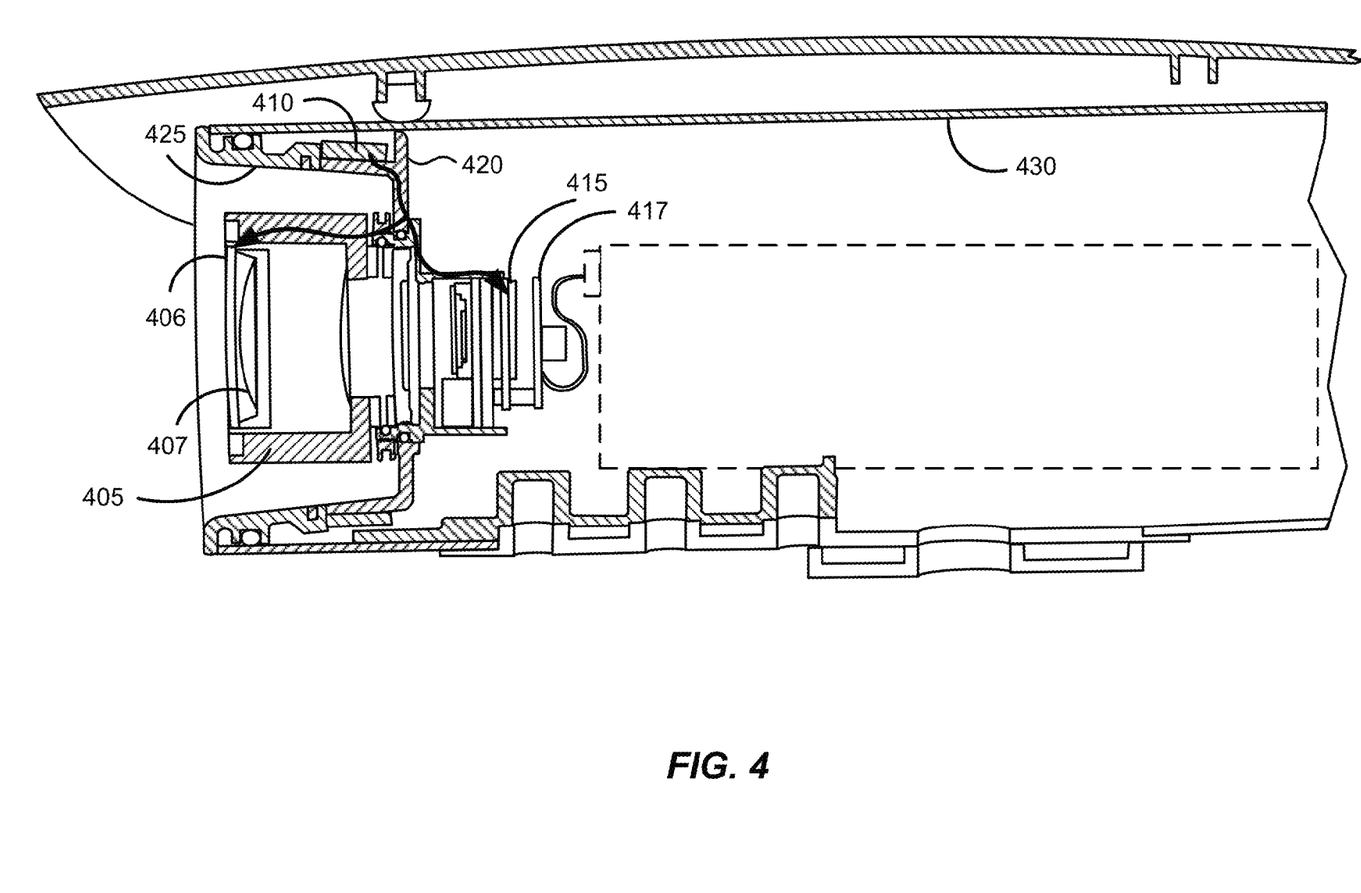
FIG. 4 is a simplified cross-sectional diagram illustrating the thermal camera system according to an embodiment of the present invention.

FIG. 4 illustrates how heat flows from the heating element 410, through the body of the mounting structure 420 (e.g., the aluminum portion of the mounting structure to which the front window 405 and the focal plane array 415 are attached. As illustrated in FIG. 4, a processor board 417, including processor(s) and one or more memories suitable for operation of the focal plane array is also attached to the mounting structure, enabling control of data flow to and from the focal plane array. In some implementations, other camera housing elements, which may also be fabricated using metallic materials such as aluminum, are utilized.

The processor(s) can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The memory provided on the processor board 417 can be local or distributed as appropriate to the particular application. The memory may include a number of memories including a main random access memory (RAM) for storage of instructions and data during program execution and a read only memory (ROM) in which fixed instructions are stored. Thus, the memory provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

As illustrated by the heavy arrows in FIG. 4, the heat from the heating element 410 wrapped around the periphery of the mounting structure 420 flows to and through the circuit cards including the card containing the focal plane array 415 (or other suitable infrared detector). The heat also flows through body of the mounting structure 420 to the front window 405, which can include optical elements such as lenses and filters, for example, a germanium lens. The heat flow to the optics of the lens assembly heats them up in order to remove any condensation or ice that would otherwise form thereon. As the temperature of the ambient environment drops toward freezing temperatures, the heating element can be activated, preventing icing of the front window.

In some embodiments, the focal plane array and the front window (i.e., optical cover 406 and/or lens 407) are preferably operated at the same temperature in order to improve or optimize camera performance (i.e., isothermal operation). Although it is preferable to operate the focal plane array and the front window at the same temperature, this is not required by the present invention and temperature difference between these elements can be present. It should be noted that optical cover is optional and some embodiments utilize the lens 407 as the front cover and the focusing element. As illustrated in FIG. 4, the thermal isolator 425 (i.e., the plastic half of the mounting structure/thermal isolator element that acts as a thermal dam (which can also be referred to as a thermal block, thermal inhibitor, or the like) in order to prevent the heat generated by the heating element from escaping into the outer shell 430 (typically fabricated from a metal material) and radiating to the environment, which would prevent the lens from being heated efficiently and would require significantly more power to achieve the heating and anti-icing for which the system is designed. Without the thermal isolator, the added power needed to accomplish anti-icing would prevent the system from meeting the Power over Ethernet power specification of 802.3af since the system would then require more power than the power available in accordance with the low power 802.3af standard. Therefore, the combination of a thermally conductive mounting structure 420 separated from the outer shell 430 by the thermally insulating thermal isolator 425 enables control of the heat flow throughout the camera system, heating the front window and focal plane array while preventing significant heat flow to the surrounding environment, all while complying with 802.3af.

It should be noted that by using the thermal conductivity of the mounting structure to transfer the heat from the heating element to the front window with little heat escaping to the environment, embodiments of the present invention enable heating of the front window without installation of a heater at the location of the front window (along with the running of associated electrical wires up to the location of the front window). The mounting structure provides this thermal conductivity while still be spatially separated from the housing.

Figure 5:
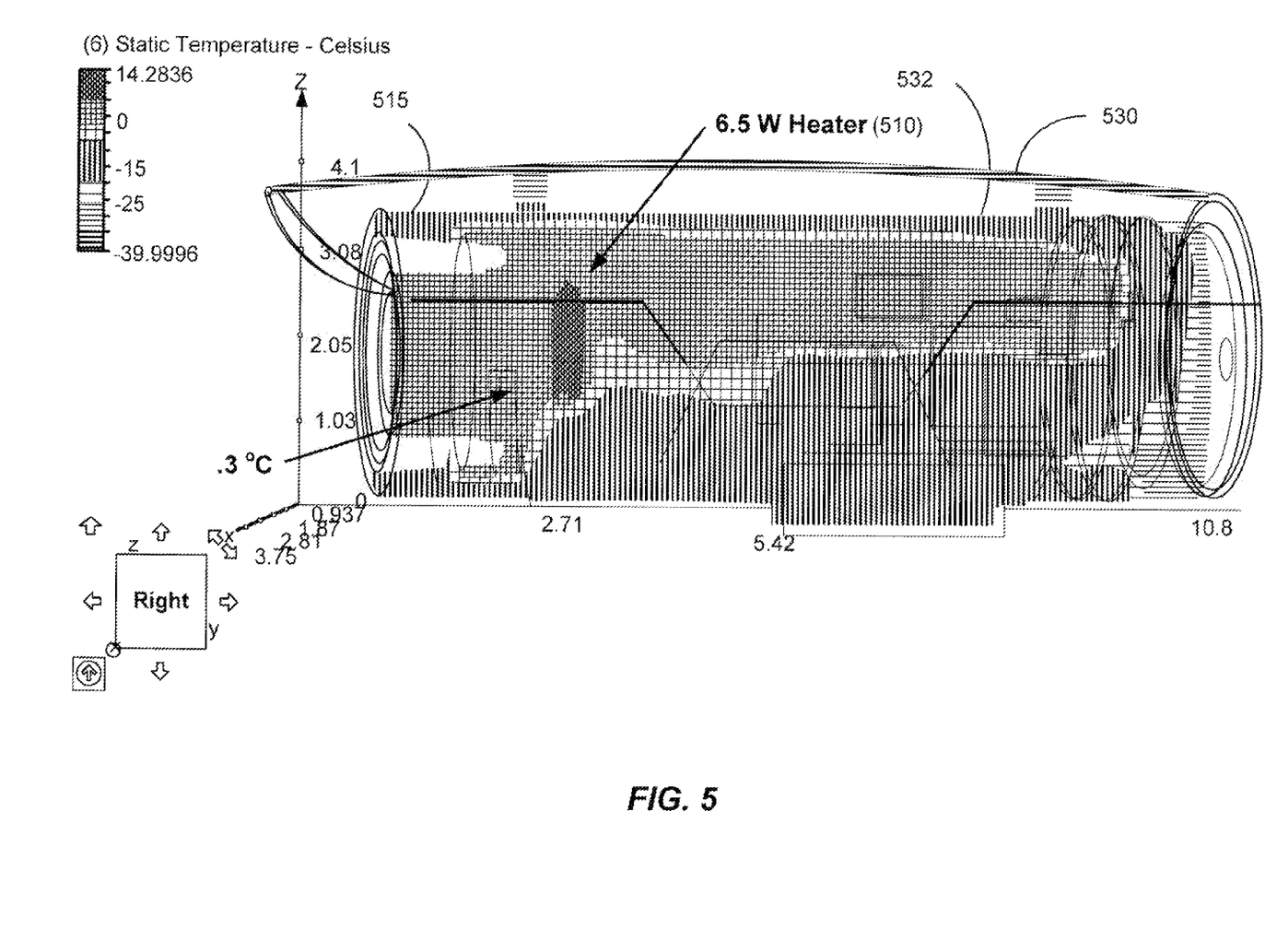
FIG. 5 is a simplified cross-sectional thermal map illustrating temperature distributions in the thermal camera system according to an embodiment of the present invention.

FIG. 5 is a simplified cross-sectional color thermal map illustrating temperature distributions in the thermal camera system according to an embodiment of the present invention. Embodiments of the present invention provide systems that manage the flow of thermal energy in the camera system, providing thermal energy to heat the front window without allowing a significant amount of heat to flow to the surrounding environment. The thermal management provided by embodiments of the present invention enables prevention of ice formation on the front window at predetermined temperatures while operating at a power level in compliance with the 802.3af PoE standard. As described below, the thermal isolator (also referred to as a thermal dam) prevents significant heat flow to the surrounding environment while providing thermal energy to the front window as well as the focal plane array.

FIG. 5 illustrates how heat flows from the heating element 510 to the various system elements. For the example illustrated in FIG. 5, an ambient temperature of −40° C. is utilized. Accordingly, the solar shroud 530 is at approximately −40° C. The outer shell 532 (also referred to as a housing or outer housing), which is separated from the solar shroud by standoffs, is at approximately −15° C., with the rear portion of the outer shell at lower temperatures. The heating element 510 is a 6.5 W heater disposed around the periphery of the mounting structure. In the figure, the heating element is at a temperature of about 0° C. and the front window is at a temperature of 0.3° C. The area in which the focal plane array is mounted is at a higher temperature because of its central location in the camera system, at a temperature of about 14° C. in the figure.

Referring to FIG. 5, the thermal isolator 515 is at a temperature of about −10° C. and prevents the heat generated by the heating element 510 from flowing to the outer shell 530.

Figure 6:
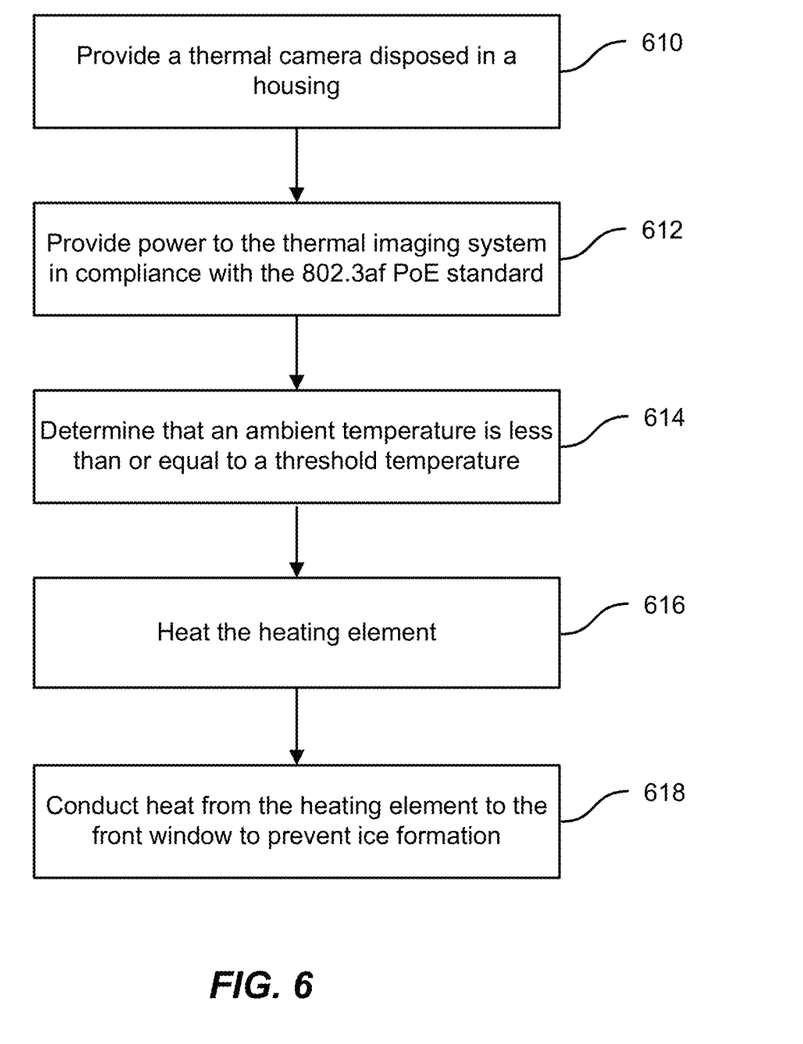
FIG. 6 is a simplified flowchart illustrating a method of operating a thermal imaging system according to an embodiment of the present invention.

FIG. 6 is a simplified method of operating a thermal imaging system according to an embodiment of the present invention. The method includes providing a thermal camera disposed in a housing (610). The thermal camera includes a mounting structure, a thermal isolator spatially separating the mounting structure from the housing, a heating element bonded to the mounting structure, and a front window coupled to the mounting structure. The front window can include a germanium lens. The method also includes providing power to the thermal imaging system in compliance with the 802.3af PoE standard (612) and determining that an ambient temperature is less than or equal to a threshold temperature. As an example, the threshold temperature can range from about −40° C. to about +65° C., more specifically between +10° C. and −10° C. In a particular embodiment, the threshold temperature ranges from about +2° C. to about 0° C.

In another exemplary embodiment, the threshold temperature of the camera system can range from about −40° C. to about +58° C. In a particular embodiment, the heater assembly is located at the front of the camera, on the optical lens assembly, and the thermistor that controls the heater algorithm ON/OFF set points is located on an internal Circuit Card Assembly away from the front of the camera. In this particular embodiment, the threshold temperature ranges to turn the heater ON and OFF are from about 10° C. to about 50° C. (to account for thermal offset differences).

The method further includes heating the heating element (614) and conducting heat from the heating element to the front window to prevent ice formation (616). In embodiments, the thermal isolator is characterized by an outside diameter greater than an outside diameter of the mounting structure, providing a spatial separation between the mounting structure and the housing, which is at ambient temperature. In some embodiments, the system is an isothermal system in which heat is also conducted to the focal plane array of the thermal camera.

It should be appreciated that the specific steps illustrated in FIG. 6 provide a particular method of operating a thermal imaging system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple substeps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A thermal imaging system comprising:
   a substantially circular mounting structure characterized by a first thermal conductivity;
   a focal plane array mounted to the mounting structure;
   an optical system coupled to the mounting structure;

a flexible electrical heating element that is thermally coupled to and wraps around a circumference of the mounting structure; and a thermal isolator coupled to the mounting structure and characterized by a second thermal conductivity lower than the first thermal conductivity.

2. The thermal imaging system of claim 1 wherein the mounting structure comprises a metallic material and the thermal isolator comprises a plastic material.

3. The thermal imaging system of claim 2 wherein the metallic material comprises an aluminum material.

4. The thermal imaging system of claim 1 wherein the optical system comprises a germanium lens.

5. The thermal imaging system of claim 1 wherein the thermal imaging system complies with the 802.3af Power over Ethernet (PoE) standard.

6. The thermal imaging system of claim 2 wherein the plastic material comprises a polycarbonate resin thermoplastic.

7. The thermal imaging system of claim 1 wherein an outside diameter of the thermal isolator is greater than an outside diameter of the mounting structure.

8. A thermal camera including:
   a housing;
   a multi-element front cover comprising:
     a thermal dam joined to the housing and having a first thermal conductivity; and
     a substantially circular mounting structure joined to the thermal dam, spatially separated from the housing, and characterized by a second thermal conductivity greater than the first thermal conductivity; and
     a flexible electrical heating element thermally coupled to and wrapped around a circumference of the mounting structure;
   an infrared imager mounted to the mounting structure; and
   a front window mounted to the mounting structure.

9. The thermal camera of claim 8 wherein the thermal camera complies with the 802.3af Power over Ethernet (PoE) standard.

10. The thermal camera of claim 8 wherein the housing conforms to Ingress Protection Code 66 (IP66).

11. The thermal camera of claim 8 wherein the thermal dam comprises a plastic material.

12. The thermal camera of claim 8 wherein the mounting structure comprises aluminum.

13. The thermal camera of claim 8 wherein the infrared imager comprises a focal plane array.

14. The thermal camera of claim 8 wherein the front window comprises an optical element.

15. The thermal camera of claim 14 wherein the optical element comprises a germanium lens.

16. The thermal camera of claim 14 wherein the mounting structure surrounds the optical element circumferentially.

17. A method of operating a thermal imaging system, the method comprising:
   providing a thermal camera disposed in a housing, wherein the thermal camera comprises:
     a substantially circular mounting structure operable to support a focal plane array;
     a thermal isolator spatially separating the mounting structure from the housing;
     an electrical heating element thermally coupled to and wrapped around a circumference of the mounting structure; and
     a front window coupled to the mounting structure;
   providing power to the thermal imaging system in compliance with the 802.3af Power over Ethernet (PoE) standard;
   determining that an ambient temperature is less than or equal to a threshold temperature;
   heating the electrical heating element; and
   conducting heat from the electrical heating element to the focal plane array and the front window.

18. The method of claim 17 wherein the threshold temperature ranges from −40° C. to +65° C.

19. The method of claim 17 wherein the thermal isolator is characterized by an outside diameter greater than an outside diameter of the mounting structure.

20. The method of claim 17 wherein the electrical heating element is flexible.

* * * * *